US005924858A

United States Patent [19]

Tuson et al.

[11] Patent Number: 5,924,858

[45] Date of Patent: Jul. 20, 1999

[54] STAGED COMBUSTION METHOD

[75] Inventors: Geoffrey Bruce Tuson, Yorktown Heights; Ronald William Schroeder, Chappaqua; Hisashi Kobayashi, Putnam Valley, all of N.Y.

[73] Assignee: Praxair Technology, Inc., Danbury, Conn.

[21] Appl. No.: 09/079,164

[22] Filed: May 15, 1998

Related U.S. Application Data

[63] Continuation-in-part of application No. 08/489,910, Jun. 13, 1995, Pat. No. 5,755,818.

[30] Foreign Application Priority Data

Jun. 12, 1996 [BR] Brazil .................................... 9602760
Jun. 12, 1996 [EP] European Pat. Off. .............. 96109423

[51] Int. Cl.[6] .................................................. F23M 3/04

[52] U.S. Cl. ................................ 431/10; 431/9; 431/190; 432/22

[58] Field of Search ................................ 431/10, 9, 190; 432/19–23

[56] References Cited

U.S. PATENT DOCUMENTS

| | | | |
|---|---|---|---|
| 3,074,707 | 1/1963 | Humphries et al. | 263/53 |
| 4,541,796 | 9/1985 | Anderson | 431/187 |
| 4,957,050 | 9/1990 | Ho | 110/346 |
| 5,076,779 | 12/1991 | Kobayashi | 431/5 |
| 5,176,086 | 1/1993 | Clark et al. | 110/346 |
| 5,186,617 | 2/1993 | Ho | 431/9 |
| 5,242,296 | 9/1993 | Tuson et al. | 431/10 |
| 5,295,816 | 3/1994 | Kobayashi et al. | 431/9 |
| 5,383,782 | 1/1995 | Yap | 432/22 |
| 5,387,100 | 2/1995 | Kobayashi | 431/10 |
| 5,411,395 | 5/1995 | Kobayashi et al. | 431/187 |
| 5,431,559 | 7/1995 | Taylor | 431/164 |
| 5,439,373 | 8/1995 | Anderson et al. | 431/10 |
| 5,601,425 | 2/1997 | Kobayashi et al. | 431/8 |

*Primary Examiner*—Larry Jones
*Attorney, Agent, or Firm*—Stanley Ktorides

[57] ABSTRACT

An improved staged combustion method useful with oxy-fuel combustion and in a furnace which contains a charge, wherein substoichiometric combustion and secondary oxidant injection are carried out in an orientation which forms a more oxidizing atmosphere proximate the charge surface and oxidizing gas recirculates from the secondary oxidant stream to the charge surface and back to the secondary oxidant stream.

7 Claims, 1 Drawing Sheet

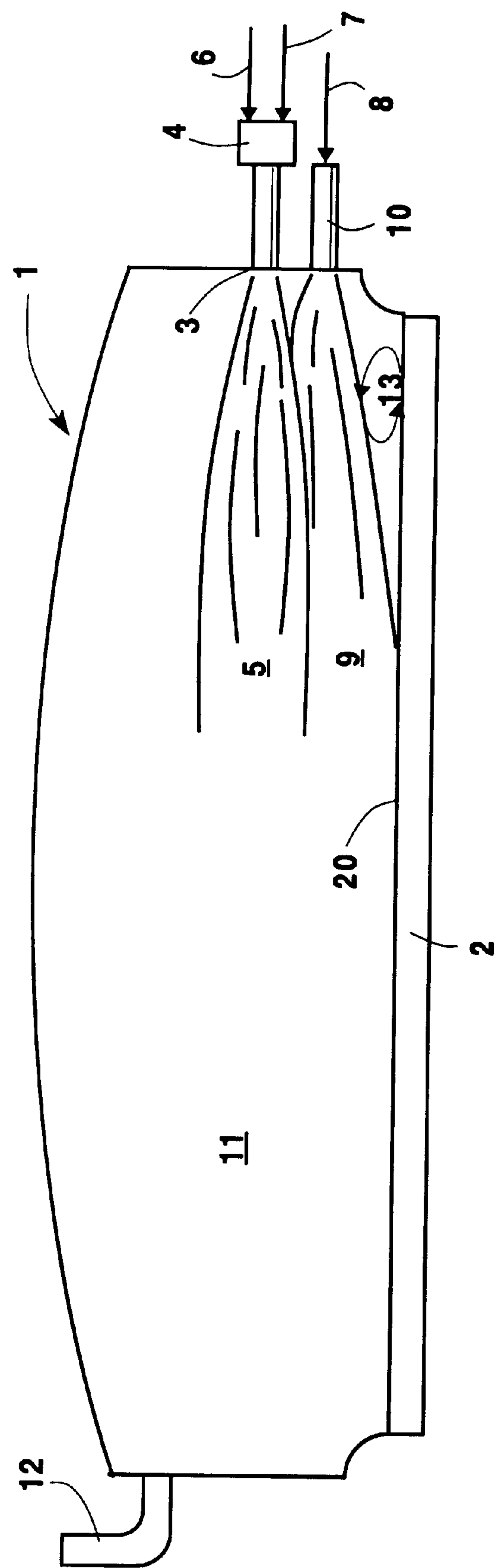
1
2
3
4
5
6
7
8
9
10
11
12
13
20

STAGED COMBUSTION METHOD

This application is a continuation-in-part of prior U.S. application Ser. No. 08/489,910 filed Jun. 13, 1995, now U.S. Pat. No. 5,755,818, issued May 26, 1998.

TECHNICAL FIELD

This invention relates generally to staged combustion within a furnace which contains a charge to be heated by heat generated by the combustion.

BACKGROUND ART

Nitrogen oxides (NOx) are a significant pollutant generated during combustion and it is desirable to reduce their generation in carrying out combustion. It is known that combustion may be carried out with reduced NOx generation by using technically pure oxygen or oxygen-enriched air as the oxidant as this reduces the amount of nitrogen provided to the combustion reaction on an equivalent oxygen basis. However the use of an oxidant having a higher oxygen concentration than that of air causes the combustion reaction to run at a higher temperature and this higher temperature kinetically favors the formation of NOx.

Staged combustion has been used to reduce NOx generation, particularly when the oxidant is a fluid having an oxygen concentration which exceeds that of air. In staged combustion, fuel and oxidant are introduced into a combustion zone in a substoichiometric ratio and combusted. Due to the excess amount of fuel available for combustion, very few of the oxygen molecules of the oxidant react with nitrogen to form NOx. Additional oxygen is provided to the combustion zone to complete the combustion in a second downstream stage.

In order to carry out effective combustion with oxidant having a higher oxygen concentration than that of air, the fuel and/or oxidant must be provided into the furnace at a relatively high velocity in order to achieve the requisite momentum. The combustion reactants must have a certain momentum in order to assure adequate mixing of the fuel and oxidant for efficient combustion. The high momentum also causes the combustion reaction products to more effectively spread throughout the furnace to transfer heat to the furnace charge. Momentum is the product of mass and velocity. An oxidant having an oxygen concentration which exceeds that of air will have a lower mass than air on an equivalent oxygen molecule basis. For example, an oxidant fluid having an oxygen concentration of 30 mole percent will have about 70 percent the mass of an oxidatively equivalent amount of air. Accordingly, in order to maintain the requisite momentum, the velocity of the combustion reaction must be correspondingly higher.

In many industrial furnace operations, the high velocity and consequent vigorous mixing and spread of the combustion reaction products within the furnace is not disadvantageous. However, in some situations it is desirable to maintain one or more of the combustion reaction products from contacting the charge. For example, one or more of the combustion reaction products could chemically react with the charge in an unwanted chemical reaction. This problem may be overcome by interposing a physical barrier between the combustion reaction and the charge, but this solution imposes a significant energy penalty on the furnace operation even when the barrier is made of material having good heat transfer properties.

Accordingly, it is an object of this invention to provide an improved staged combustion method wherein fuel and oxidant combust in a combustion reaction having the requisite momentum, with the charge being protected from deleterious contact with combustion reaction products while still ensuring good heat transfer from the combustion reaction to the charge.

SUMMARY OF THE INVENTION

The above and other objects, which will become apparent to those skilled in the art upon a reading of this disclosure, are attained by the present invention, which is:

A method for carrying out staged combustion comprising:

(A) providing within a furnace which contains a charge, at a point above the charge surface, a primary stream comprising fuel and primary oxidant in a substoichiometric ratio not exceeding 70 percent of stoichiometric, said primary oxidant being a fluid comprising at least 50 mole percent oxygen;

(B) combusting fuel and primary oxidant within the primary stream to produce heat and combustion reaction products including unburned fuel;

(C) providing a secondary stream comprising secondary oxidant within the furnace between the charge and the primary stream, said secondary oxidant being a fluid comprising at least 50 mole percent oxygen;

(D) recirculating a portion of the secondary oxidant from the secondary stream to the charge surface and back to the secondary stream;

(E) contacting the charge surface with the lower boundary of the secondary stream; and (F) combusting secondary oxidant from the secondary stream with unburned fuel to provide additional heat and combustion reaction products within the furnace.

As used herein the term "products of complete combustion" means one or more of carbon dioxide and water vapor.

As used herein the term "products of incomplete combustion" means one or more of carbon monoxide, hydrogen, carbon and partially combusted hydrocarbons.

As used herein the term "unburned fuel" means fuel which has undergone no combustion and/or products of incomplete combustion.

As used herein the term "stoichiometric" means the ratio of oxygen to fuel for combustion purposes. A stoichiometric ratio of less than 100 percent means there is less oxygen present than the amount necessary to completely combust the fuel present, i.e. fuel-rich conditions. A stoichiometric ratio greater than 100 percent means there is more oxygen present than the amount necessary to completely combust the fuel, i.e. excess oxygen conditions.

BRIEF DESCRIPTION OF THE DRAWING

The sole FIGURE is a simplified cross-sectional representation of one embodiment of the invention.

DETAILED DESCRIPTION

The invention will be described in detail with reference to the drawing. Referring now to the FIGURE, there is shown industrial furnace 1 which contains a charge 2 having a surface 20. Any industrial furnace which is heated by one or more burners may be used in the practice of this invention. Examples of such furnaces include a steel reheating furnace wherein the charge is steel, an aluminum melting furnace wherein the charge is aluminum, a glass melting furnace wherein the charge comprises glassmaking materials, and a cement kiln wherein the charge comprises cement.

Fuel 6 and primary oxidant 7 are provided into furnace 1 at a level 3 above charge surface 20 such as through burner

4. The fuel and primary oxidant may be injected into furnace 1 separately or together, in a premixed condition, and form primary stream 5. The fuel and primary oxidant may be provided into furnace 1 through a plurality of burners. Any suitable oxy-fuel burner may be employed in the practice of this invention. One particularly preferred oxy-fuel burner for use in the practice of this invention is the fuel jet burner disclosed in U.S. Pat. No. 5,411,395 to Kobayashi et al. which is incorporated herein by reference.

The fuel may be any gas or other fluid which contains combustibles which may combust in the combustion zone of the furnace. Among such fuels one can name natural gas, coke oven gas, propane, methane and oil.

The primary oxidant is a fluid having an oxygen concentration of at least 50 volume percent oxygen, preferably at least 90 volume percent oxygen. The primary oxidant may be commercially pure oxygen having an oxygen concentration of 99.5 percent or more.

The fuel and primary oxidant are provided into furnace 1 at flowrates such that the stoichiometric ratio of primary oxygen to fuel is less than 70 percent and preferably is within the range of from 5 to 50 percent of stoichiometric.

The primary stream has a velocity exceeding 100 feet per second (fps), and preferably within the range of from 120 to 300 fps, in order to impart the requisite momentum to the combustion reactants. The velocity of the primary stream is the actual velocity when the fuel and primary oxidant are provided premixed into the furnace and is the mass flux weighted velocity when the fuel and primary oxidant are provided at different velocities into the furnace. The fuel and primary oxidant combust within primary stream 5 in a combustion reaction to produce heat and combustion reaction products. Combustion reaction products may include products of complete combustion but, owing to the defined substoichiometric primary oxygen to fuel ratio, will include unburned fuel. The incomplete combustion of the fuel with the primary oxidant enables the combustion of fuel and primary oxidant to proceed at a substantially lower temperature than would otherwise be the case, thus reducing the tendency of NOx to form. The combustion reaction products may also include some residual oxygen because of incomplete mixing and short residence time during the combustion reaction although it is possible that the concentration of oxygen within the combustion reaction products is zero.

Secondary oxidant 8 is provided within furnace 1 through lance 10 in a secondary stream to form secondary oxidant gas layer 9 proximate charge 2 and between the combustion reaction in primary stream 5 and charge 2. Secondary oxidant gas stream or layer 9 has an upper boundary and a lower boundary. The secondary oxidant is preferably injected into the furnace below level 3 although it may be injected into the furnace at the same level or even above level 3 and angled downward toward the charge. The secondary oxidant may be provided into the furnace from a point vertically below the fuel and primary oxidant, or from a point offset from the vertical, such as by an angle of up to 45 degrees.

The secondary oxidant is in the form of a fluid having an oxygen concentration of at least 50 mole percent, preferably at least 90 mole percent. The secondary oxidant may be commercially pure oxygen. Secondary oxidant 8 is provided into furnace 1 in the secondary stream at a high initial velocity which is more than 50 fps, and preferably within the range of from 55 to 150 fps, greater than that of primary stream 5. It is important to the practice of this invention that the oxidant have an oxygen concentration significantly greater than that of air. For a given amount of fuel consumption, the total volume of gases passed through the furnace lessens as the oxygen concentration of the oxidant increases. This lower volume flux through the furnace, at the velocities of the staged combustion practice of this invention, enables the establishment of the secondary oxidant layer proximate the charge having a different composition than the contents in the rest of the furnace.

The secondary oxidant stream forming gas layer 9 is a jet that entrains furnace gases and expands as it passes through the furnace. The high velocity of the secondary stream causes a portion of the secondary oxidant to recirculate at or near the charge surface and back to the secondary stream as shown by recirculation flow 13 in the FIGURE. This increases the amount of charge surface area contacted by gases more oxidizing than the combustion reaction products contained throughout the majority of region 11.

The lower boundary of the secondary oxidant stream contacts the charge surface exposing it to a more oxidizing atmosphere than that contained in the majority of region 11. The upper boundary or region of the secondary oxidant stream intersects with primary stream 5.

Secondary oxidant gas layer 9 has an oxygen concentration which exceeds that of the combustion reaction products within the primary stream. Although any suitable oxygen lance may be used to inject the secondary oxidant into the furnace in the practice of this invention, it is preferred that the secondary oxidant be injected into the furnace using the gas injection lance disclosed in U.S. Pat. No. 5,295,816 to Kobayashi et al. which is incorporated herein by reference.

The secondary oxidant is provided into the furnace at a flowrate such that, when added to the primary oxidant, establishes a stoichiometric ratio with the fuel of at least 90 percent, and preferably within the range of from 100 to 110 percent. When the stoichiometric ratio of the primary and secondary oxidant to the fuel is less than 100 percent, the remaining oxygen needed to achieve complete combustion of the fuel within the furnace may be provided by infiltrating air. Preferably, the momentum ratio of the fuel and primary oxidant stream to the secondary oxidant stream is about 0.5 although some divergence is acceptable, such as a momentum ratio within the range of from 0.3 to 1.0 or less.

A recent significant advancement in the field of staged combustion is disclosed in U.S. Pat. No. 5,242,296 to Tuson et al. The present invention differs from the typical staged combustion arrangement, such as that used in the aforesaid Tuson et al. technology, in that the secondary oxidant is provided within the furnace significantly below that of the point where the primary oxidant and fuel are injected into the furnace.

Heat generated in the combustion reaction within primary stream 5 radiates to the charge to heat the charge. This heat radiates from primary stream 5 to the charge through secondary oxidant gas layer 9. Very little heat is passed from the combustion reaction to the charge by convection.

Because of the position at which the secondary oxidant is provided into the furnace, there is formed a more oxidizing gas layer 9 which interacts with charge 2 in a manner which differs from the interaction which would occur were the furnace atmosphere homogeneous.

Downstream of the combustion reaction within primary stream 5 the secondary oxidant and the unburned fuel will mix, such as in region 11 within furnace 1, thus serving to complete the combustion of the fuel and provide additional heat and combustion reaction products within the furnace. In this manner gas layer 9 provides three functions simultaneously. It protects the charge from the combustion reaction products in the primary stream. It provides oxidizing atmosphere in contact with the charge. And it serves as the source of the secondary oxygen to complete the staged combustion.

Preferably the combustion reaction products in furnace 1 are exhausted from the furnace from a point not below level 3 where fuel and primary oxidant are provided into the furnace, such as from flue 12.

In a preferred practice of the invention, Xj/Ds exceeds 5 and preferably exceeds 10, and Xc/Ds is less than 100 and preferably is less than 50. Xj is the axial distance from the point where the secondary oxidant is injected into the furnace to the interaction point of the secondary oxidant with the fuel/primary oxidant combustion reaction stream. This interaction point is the point where the diverging cones with a half angle of 5 degrees from the fuel/primary oxidant and the secondary oxidant injection points first intersect. Ds is the equivalent jet diameter for the secondary oxidant and is defined as Ds=actual jet diameter multiplied by the square root of the (secondary oxidant jet density/furnace gas density). Xc is the axial distance from the point where the secondary oxidant is injected into the furnace to the jet-charge interaction point which is defined as the point where a diverging cone with a half angle of 5 degrees from the secondary oxidant injection point first intersects with the charge surface.

Although the invention has been discussed in detail with reference to a certain preferred embodiment, those skilled in the art will recognize that there are other embodiments of the invention within the spirit and the scope of the claims.

We claim:

1. A method for carrying out staged combustion comprising:

(A) providing within a furnace which contains a charge, at a point above the charge surface, a primary stream comprising fuel and primary oxidant in a substoichiometric ratio not exceeding 70 percent of stoichiometric, said primary oxidant being a fluid comprising at least 50 mole percent oxygen;

(B) combusting fuel and primary oxidant within the primary stream to produce heat and combustion reaction products including unburned fuel;

(C) providing a secondary stream comprising secondary oxidant within the furnace between the charge and the primary stream, said secondary oxidant being a fluid comprising at least 50 mole percent oxygen;

(D) recirculating a portion of the secondary oxidant from the secondary stream to the charge surface and back to the secondary stream;

(E) contacting the charge surface with a lower boundary of the secondary stream; and (F) combusting secondary oxidant from the secondary stream with unburned fuel to provide additional heat and combustion reaction products within the furnace.

2. The method of claim 1 wherein the fuel and primary oxidant are provided into the furnace in a substoichiometric ratio within the range of from 5 to 50 percent of stoichiometric.

3. The method of claim 1 wherein combustion reaction products are withdrawn from the furnace at a level not below the level where fuel and primary oxidant are provided into the furnace.

4. The method of claim 1 wherein the charge comprises at least one of steel, aluminum, glassmaking material and cement.

5. The method of claim 1 wherein the secondary oxidant is provided at a flowrate sufficient to provide oxygen into the furnace so that the stoichiometric ratio of the primary and secondary oxidant to the fuel injected into the furnace is at least 90 percent.

6. The method of claim 1 wherein the primary stream has a velocity exceeding 100 feet per second.

7. The method of claim 1 wherein the secondary stream has a velocity more than 50 feet per second greater than the velocity of the primary stream.

* * * * *